US010609018B2

(12) United States Patent
Toff

(10) Patent No.: US 10,609,018 B2
(45) Date of Patent: Mar. 31, 2020

(54) GESTURE-BASED ACCESS CONTROL IN VIRTUAL ENVIRONMENTS

(71) Applicant: Google LLC, Mountain View, CA (US)

(72) Inventor: Jason Toff, Hoboken, NJ (US)

(73) Assignee: GOOGLE LLC, Mountain View, CA (US)

(*) Notice: Subject to any disclaimer, the term of this patent is extended or adjusted under 35 U.S.C. 154(b) by 187 days.

(21) Appl. No.: 15/804,212

(22) Filed: Nov. 6, 2017

(65) Prior Publication Data
US 2018/0159841 A1 Jun. 7, 2018

Related U.S. Application Data

(60) Provisional application No. 62/430,119, filed on Dec. 5, 2016.

(51) Int. Cl.
H04L 29/06 (2006.01)
G06F 3/01 (2006.01)
(Continued)

(52) U.S. Cl.
CPC .......... H04L 63/083 (2013.01); G06F 1/163 (2013.01); G06F 1/1626 (2013.01); G06F 3/011 (2013.01); G06F 3/017 (2013.01); G06F 21/31 (2013.01); G06Q 10/1095 (2013.01); H04L 63/062 (2013.01); H04L 63/08 (2013.01);
(Continued)

(58) Field of Classification Search
CPC ........ G06F 1/163; G06F 1/1626; G06F 21/31; G06F 3/017; G06F 3/011; G06Q 10/109; G06Q 10/1095; H04L 63/083; H04L 63/0807; H04L 63/08; H04L 67/38;
(Continued)

(56) References Cited

U.S. PATENT DOCUMENTS 8,051,462 B2 11/2011 Hamilton et al.
9,276,928 B2 * 3/2016 Mani .................. H04L 63/0807
(Continued)

OTHER PUBLICATIONS

International Search Report and Written Opinion for International Application PCT/US2017/060415, dated Feb. 2, 2018, 11 pages.

Primary Examiner — Oleg Korsak
Assistant Examiner — Feliciano S Mejia
(74) Attorney, Agent, or Firm — Brake Hughes Bellermann LLP

(57) ABSTRACT

Techniques of access control in VR environments involve defining a series of gestures that users attending a private meeting within a virtual environment carry out to be allowed into the private meeting. Along these lines, when a user sets up a meeting to take place within a virtual environment, the user may define a series of gestures (e.g., swipes, circles, etc.) that may serve as an effective "secret handshake" that gains admittance to the private meeting. In one implementation, each person invited to the private meeting is given the same gesture to form in the virtual environment that provides access to the private meeting. In other implementations, each user has their own respective gesture that, when matched along with an identifier identifying that user, provides the access. Advantageously, such gestures are easily defined and executed by the users and recognized by servers that control private meetings within the virtual environment.

21 Claims, 8 Drawing Sheets

(51) Int. Cl.
*G06F 1/16* (2006.01)
*G06F 21/31* (2013.01)
*G06Q 10/10* (2012.01)
*H04W 12/06* (2009.01)
*H04W 12/00* (2009.01)
*G06F 3/0487* (2013.01)
*G02B 27/01* (2006.01)

(52) U.S. Cl.
CPC .......... *H04L 63/0807* (2013.01); *H04L 63/10* (2013.01); *H04L 67/38* (2013.01); *H04W 12/06* (2013.01); *G02B 27/017* (2013.01); *G06F 3/0487* (2013.01); *G06Q 10/109* (2013.01); *H04W 12/00508* (2019.01)

(58) Field of Classification Search
CPC ................ H04L 63/062; H04L 63/10; H04W 12/00508; H04W 12/06
See application file for complete search history.

(56) References Cited

U.S. PATENT DOCUMENTS

| | | | |
|---|---|---|---|
| 9,317,126 B2* | 4/2016 | Fujimaki | G02B 27/0172 |
| 9,468,848 B2* | 10/2016 | Murillo | G06F 3/017 |
| 9,769,355 B2* | 9/2017 | Su | H04N 1/4426 |
| 9,778,464 B2* | 10/2017 | Lundberg | G06K 9/48 |
| 2009/0303984 A1 | 12/2009 | Clark et al. | |
| 2012/0204118 A1 | 8/2012 | Lefar et al. | |
| 2015/0067536 A1* | 3/2015 | Leorin | H04W 12/06 |
| | | | 715/753 |
| 2016/0285882 A1 | 9/2016 | Brunn et al. | |
| 2016/0307201 A1* | 10/2016 | Turgeman | G06Q 20/4016 |
| 2017/0063852 A1* | 3/2017 | Azar | G06F 21/32 |
| 2017/0103582 A1* | 4/2017 | Novak | G02B 27/017 |
| 2018/0096507 A1* | 4/2018 | Valdivia | G06F 1/163 |

* cited by examiner

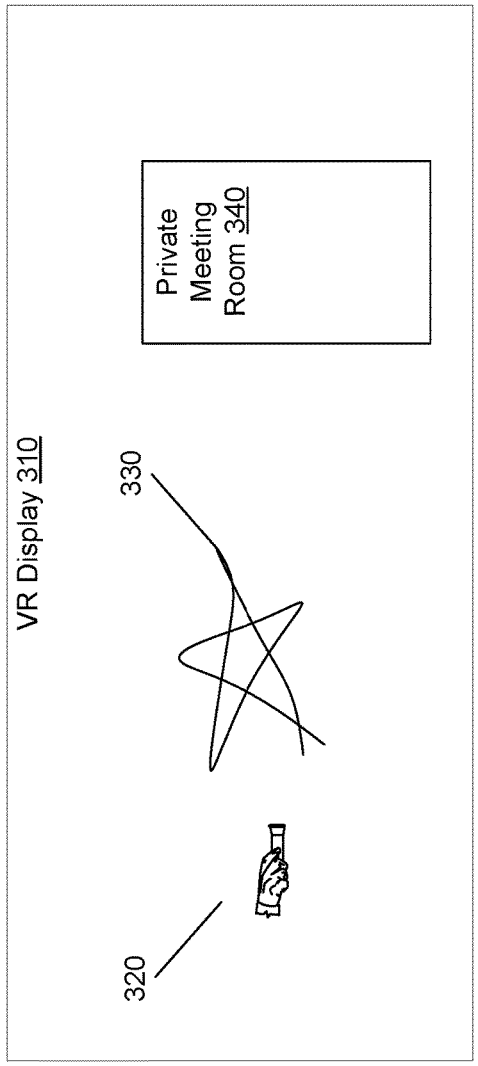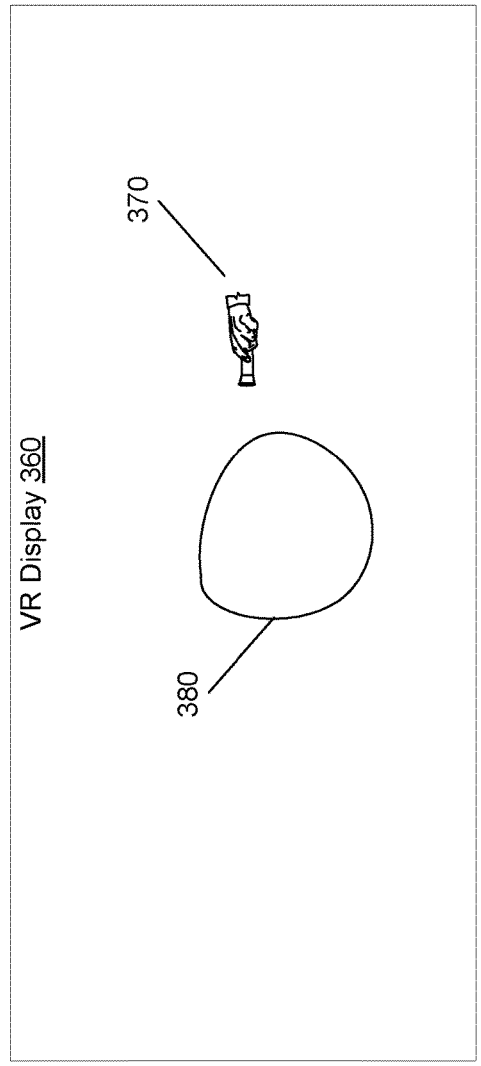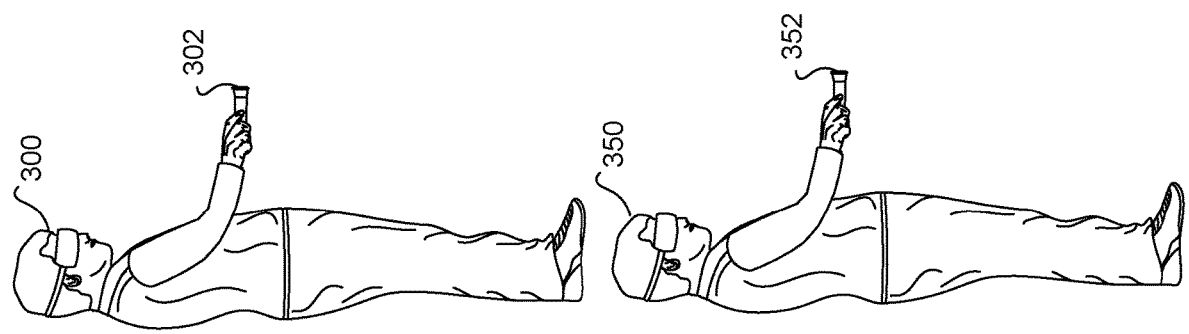

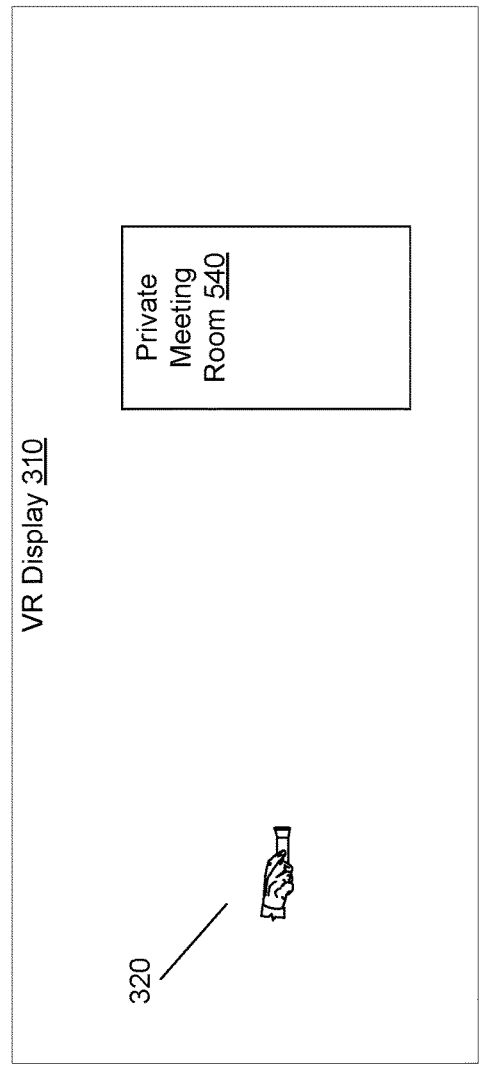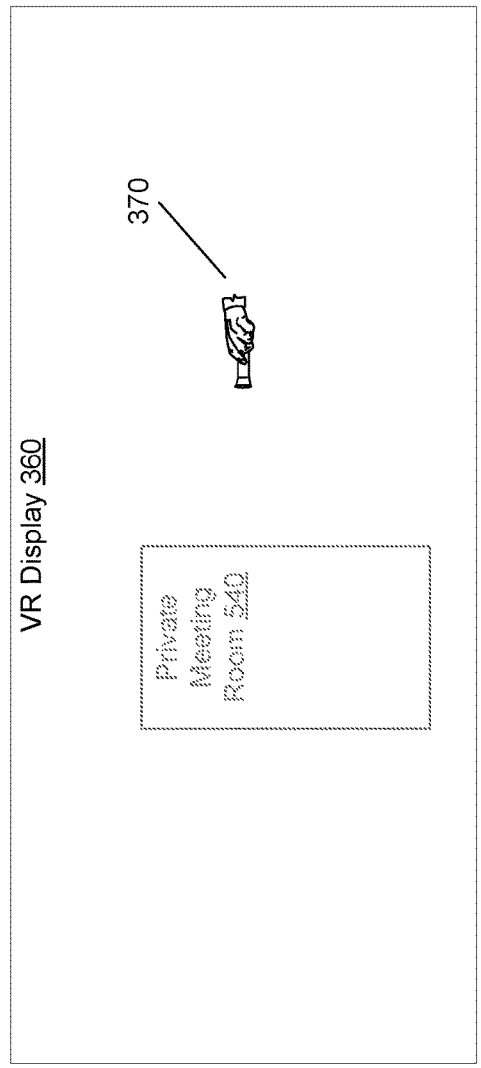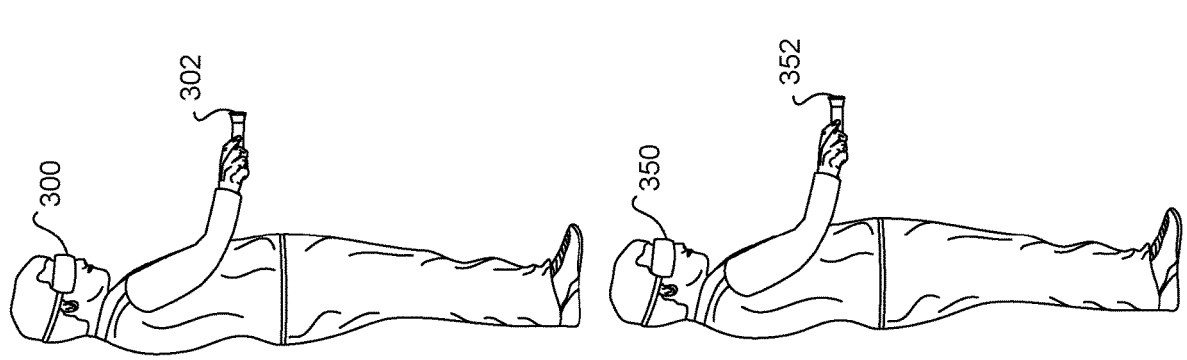

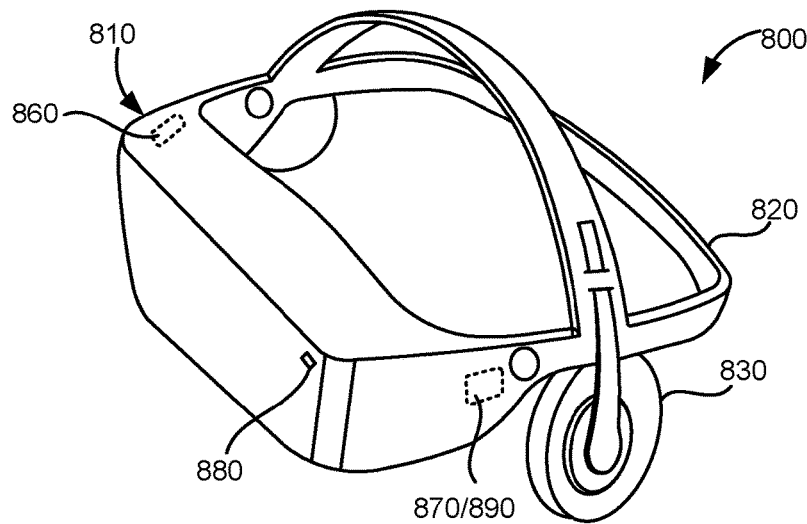
FIG. 8A
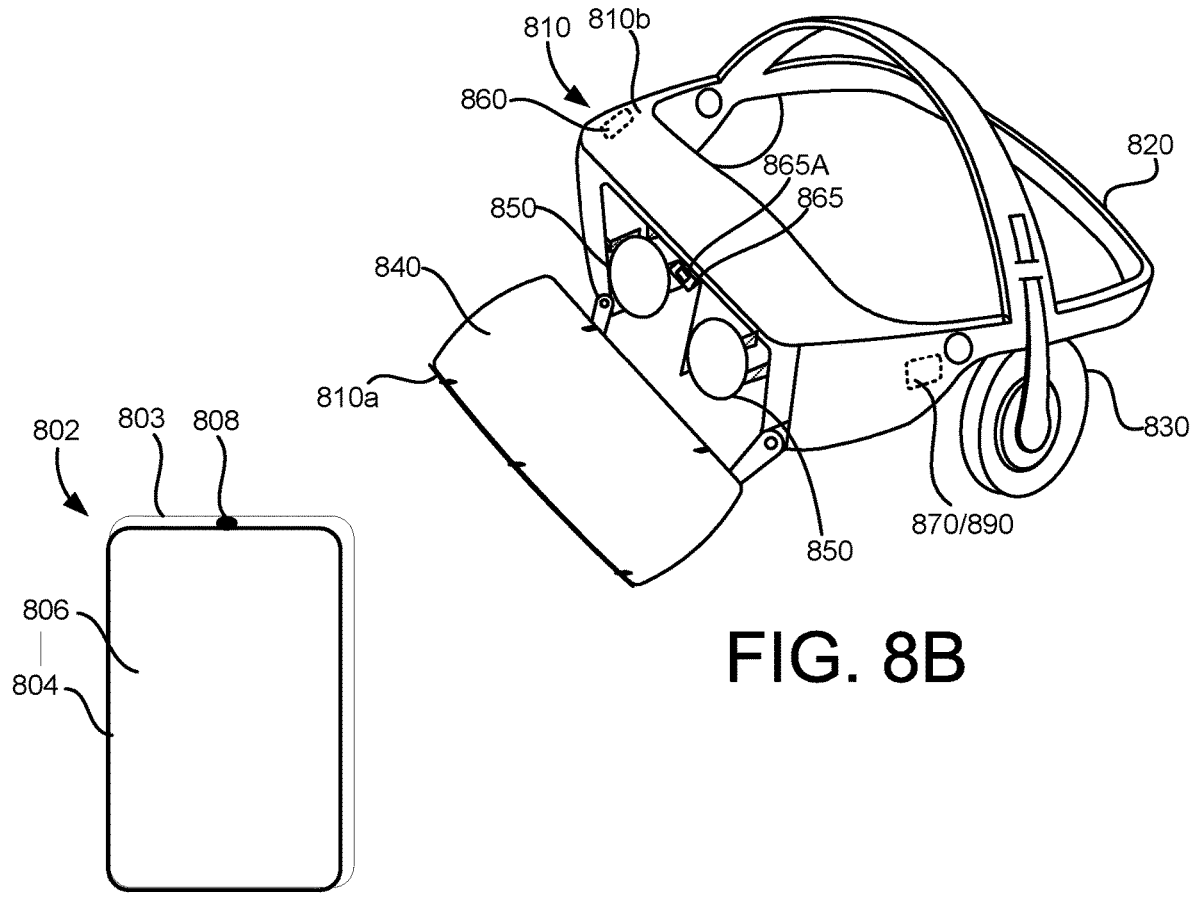
FIG. 8C
FIG. 8B

GESTURE-BASED ACCESS CONTROL IN VIRTUAL ENVIRONMENTS

CROSS-REFERENCE TO RELATED APPLICATION

This application is a Nonprovisional of, and claims priority to, U.S. Provisional Patent Application No. 62/430,119, filed on Dec. 5, 2016, entitled "GESTURE-BASED ACCESS CONTROL IN VIRTUAL ENVIRONMENTS", the disclosure of which is incorporated by reference herein in its entirety.

TECHNICAL FIELD

This description relates to access control in virtual reality environments, specifically controlling access to private meetings.

Some users communicating over a network may use private meetings for discussions that are not open to all users on the network. A conventional technique of ensuring that only the intended users attend the private meeting over the network is to generate a passcode for the private meeting. Each user attending the private meeting would then type in the passcode to a server in order to be allowed into the private meeting.

SUMMARY

In one general aspect, a method can include generating, by processing circuitry of a virtual reality (VR) server, a virtual environment with which users external to the VR server interact, the virtual environment including a virtual meeting room. The method can also include receiving a request to schedule a private meeting in the virtual meeting room of the virtual environment, the request including a set of user identifiers identifying a set of the users authorized to attend the private meeting and gesture data resulting from a gesture formed by a user of the set of the users authorized to attend the private meeting. The method can further include receiving a new user identifier identifying a user and new gesture data generated by the user. The method can further include granting or denying the user access to the private meeting according to whether the new user identifier matches one of the set of user identifiers and whether the new gesture identifier matches one of the set of gesture identifiers.

The details of one or more implementations are set forth in the accompanying drawings and the description below. Other features will be apparent from the description and drawings, and from the claims.

BRIEF DESCRIPTION OF THE DRAWINGS

FIGS. 3A and 3B are diagrams of an example set of users forming gestures according to the improved techniques shown in FIG. 1.

FIGS. 5A and 5B are diagrams of an example set of users identifying themselves as authorized users with respective tokens according to the improved techniques shown in FIG. 1.

FIGS. 8A, 8B, and 8C are diagrams depicting the example VR HMD and controller.

DETAILED DESCRIPTION

Some users communicating over a network may use private meetings for discussions that are not open to all users on the network. A conventional technique of controlling access to the private meeting over the network is to generate a passcode for the private meeting. Each user attending the private meeting may then type in the passcode to a server in order to be allowed into the private meeting.

The conventional approach to controlling access to private meetings works well in environments in which a user is not immersed, e.g., at the desk and on the phone. In three-dimensional immersive environments, such as VR, however, the conventional approach to access control is not convenient and may actually hinder a timely meeting within the virtual environment.

In accordance with the implementations described herein, improved techniques of access control in VR environments involve defining a series of gestures that users attending a private meeting within a virtual environment perform to be allowed into the private meeting. Along these lines, when a user sets up a meeting to take place within a virtual environment, the user may define a series of gestures (e.g., swipes, circles, etc.) that may serve as an effective secret handshake that gains admittance to the private meeting. In one implementation, each person invited to the private meeting is given the same gesture to perform in the virtual environment that provides access to the private meeting. In other implementations, each user has their own respective gesture that, when matched along with an identifier identifying that user, provides the access. Advantageously, such gestures are easily defined and executed by the users and recognized by servers that control private meetings within the virtual environment.

Figure 1:
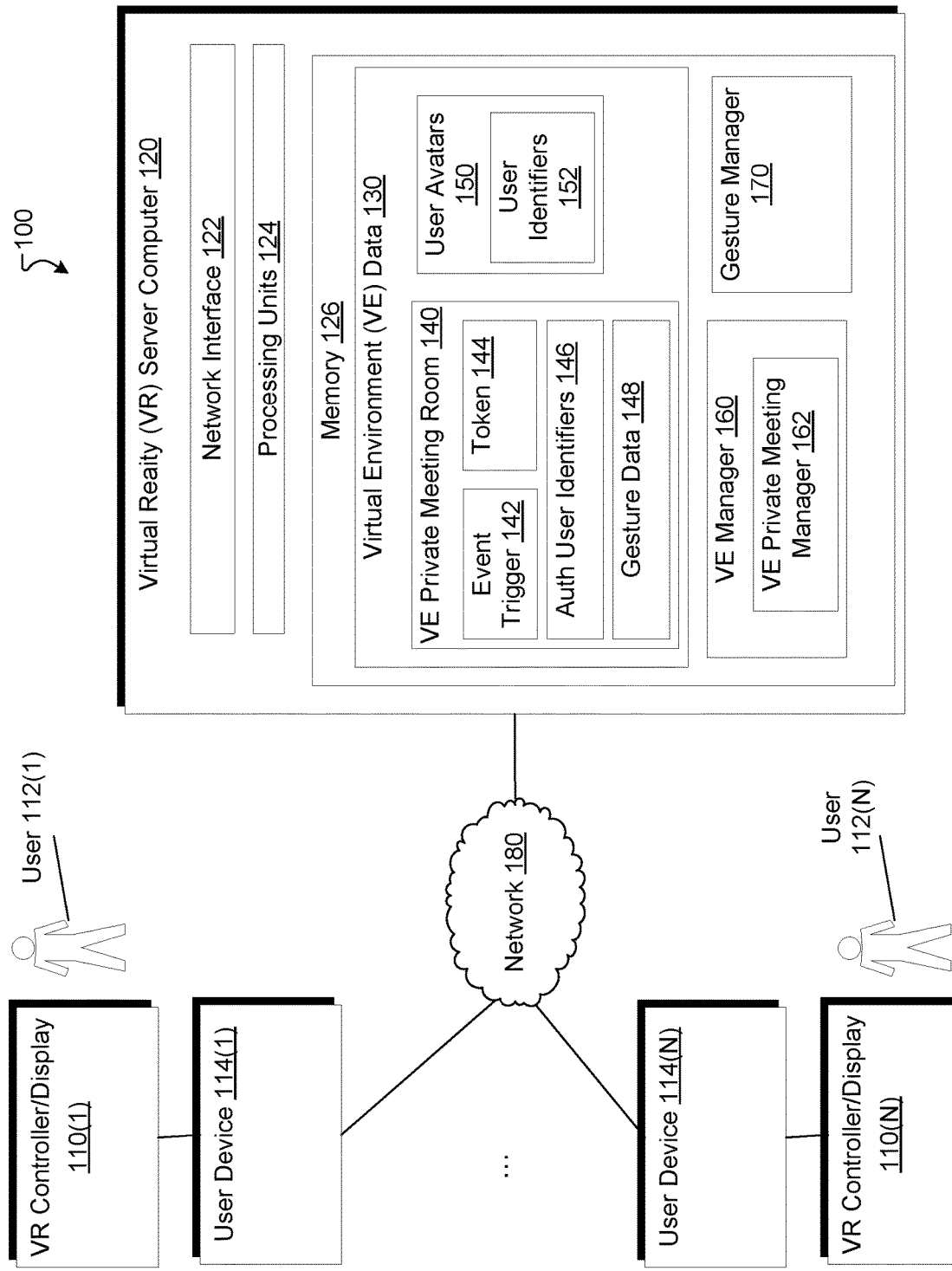
FIG. 1 is a diagram that illustrates an example electronic environment in which improved techniques described herein may be implemented.

FIG. 1 is a diagram that illustrates an example electronic environment 100 in which the above-described improved techniques may be implemented. As shown, in FIG. 1, the electronic environment 100 includes a plurality of users 112(1), . . . , 112(N), each immersed in a VR environment vis a respective VR Controller 110(1), . . . , 110(N) powered by a user device 114(1), . . . , 114(N). The electronic environment 100 also includes a VR server computer 120 and a network 180.

The VR controller 110 may take the form of a head-mounted display (HMD) which is worn by the user 112 to provide an immersive virtual environment. In the example electronic environment 100, the user 112(1) that wears the VR controller 110(1) holds a user device, i.e., user device 114(1). The user device 114(1) may be, for example, a smartphone, a controller, a joystick, or another portable handheld electronic device(s) that may be paired with, and communicate with, the VR controller 110(1) for interaction in the immersive virtual environment. The user device 114(1) may be operably coupled with, or paired with the VR controller 110(1) via, for example, a wired connection, or a wireless connection such as, for example, a WiFi or Bluetooth connection. This pairing, or operable coupling, of the user device 114(1) and the VR controller 110(1) may provide for communication between the user device 114(1) and the VR controller 110(1) and the exchange of data between the user device 114(1) and the VR controller 110(1). This may allow the user device 114(1) to function as a controller in communication with the VR controller 110(1) for interacting in the immersive virtual environment. That is, a manipulation of the user device 114(1), such as, for example, a beam or ray emitted by the user device 114(1) and directed to a virtual object or feature for selection, and/or an input received on a touch surface of the user device 114(1), and/or a movement of the user device 114(1), may be translated into a corresponding selection, or movement, or other type of interaction, in the immersive virtual environment provided by the VR controller 110(1).

The VR server computer 120 is configured to generate data for the immersive virtual environment and transmit that data to the user device, e.g., 114(1) over the network 150. As illustrated in FIG. 1, the VR server computer 120 is implemented as a computer system that is in communication with the user device 114(1) over the network 150.

In some embodiments, one or more of the components of the VR server computer 120 can be, or can include processors (e.g., processing units 124) configured to process instructions stored in the memory 126. Examples of such instructions as depicted in FIG. 1 include a Virtual Environment (VE) manager 160 and a gesture manager 170. Further, as illustrated in FIG. 1, the memory 126 is configured to store various data, which is described with respect to the respective managers that use such data.

The VE manager 160 is configured to generate and process the virtual environment, represented in the VR server computer 120 as VE data 130. For example, the VE manager 130 may be configured to define a virtual conference center where the users 112(1), . . . , 112(n) are attendees. Along these lines, the VE manager 160 includes a VE private meeting manager 162.

The private meeting manager 162 is configured to schedule and control access to private meetings within the virtual environment. For example, when a user 112(1) immersed in the virtual environment wishes to schedule a private meeting, e.g., a meeting that is attended only by those given authorization to attend, the user 112(1) may define a private meeting room 140.

In one implementation, the user 112(1) indicates via the VR controller/display 110(1) that the user 112(1) would like to schedule a meeting. For example, upon receiving such an indication, the VE private meeting manager 162 would display a menu to the user 112(1) with choices of time and/or duration of the private meeting, as well as a list of potential invitees to the meeting. In this implementation, the user 112(1) may define a single gesture that each of the invitees that accept their invitation would need to know in order to gain admittance to the private meeting. In another implementation, each of the invitees that accepts their respective invitation performs a gesture that they perform again in order to gain admittance to the private meeting.

The gesture manager 170 is configured to match gestures performed by users to predefined gesture identifiers stored in the memory 126. For example, suppose that the user 112(1) who schedules a private meeting selects a five-pointed star as the gesture that users perform in order to gain access to the private meeting. When a user, e.g., user 112(2), wishes to be given access to the private meeting, the user 112(2) performs a gesture. The gesture manager 170 is configured to compare the gesture to the five-pointed star stored in the memory 126. If the gesture performed is sufficiently close to the star, then the gesture manager 170 indicates to the VE private meeting manager 162 that the user 112(2) may be granted access to the private meeting. If the gesture performed by an avatar 150 of the user 112(2) is not sufficiently close to the star (e.g., not having five points), then the gesture manager 170 indicates to the VE private meeting manager 162 that the user 112(2) may be denied access to the private meeting until the user 112(2) performs a gesture sufficiently close to the star.

In some implementations, each user authorized to access the private meeting may select their own gesture data 148. In this case, upon receiving an invitation to attend the private meeting, each user, e.g., user 112(2), selects gesture data 148 corresponding to a user identifier 152 of that user 112(2). When the user 112(2) requests access to the private meeting, the gesture manager 170 is configured to compare the user identifier 152 to a stored, authorized user identifier 146 and a gesture performed by the user 112(2) to gesture data 148 corresponding to the user identifier 146 of that user 112(2).

In some implementations, the gesture data 148 includes a plurality of coordinates in a sequence. The plurality of coordinates represents samples of a path taken by a user device, e.g., user device 114(1), as the user 112(1) performs the gesture holding the user device 114(1).

In some implementations, the VE private meeting manager 162 is configured to begin the private meeting according to a predefined event trigger 142. For example, the event trigger 142 may be a time at which the private meeting is to occur. In other implementations, however, the event trigger 142 may be an indicator indicating that the number of users in the virtual environment is greater than some threshold number of users.

In some implementations, the VE private manager 162 generates tokens 144 for each user in response to the private meeting being formed. Each token 144 provides additional security for the private meeting because the only users who have a token 144 may be granted access to the private meeting. In some further implementations, each token 144 is generated using a cryptographic key.

The VR server computer 120 includes a network interface 122, one or more processing units 124, and memory 126. The network interface 122 includes, for example, Ethernet adaptors, Token Ring adaptors, and the like, for converting electronic and/or optical signals received from the network 150 to electronic form for use by the VR server computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the VR server computer 120 120 can be configured to operate within a cluster of devices (e.g., a server farm). In such an implementation, the functionality and processing of the components of the VR server computer 120 can be distributed to several devices of the cluster of devices.

The components of the VR server computer 120 can be, or can include, any type of hardware and/or software configured to process attributes. In some implementations, one or more portions of the components shown in the components of the VR server computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the VR server computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the VR server computer 120 (or portions thereof) can be configured to operate within a network. Thus, the components of the VR server computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the VR server computer 120 can be, or can include, processors configured to process instructions stored in a memory. For example, a VE communications manager 160 (and/or a portion thereof) and a VE conflict resolution manager 170 can be a combination of a processor and a memory configured to execute instructions related to a process to implement one or more functions.

Figure 2:
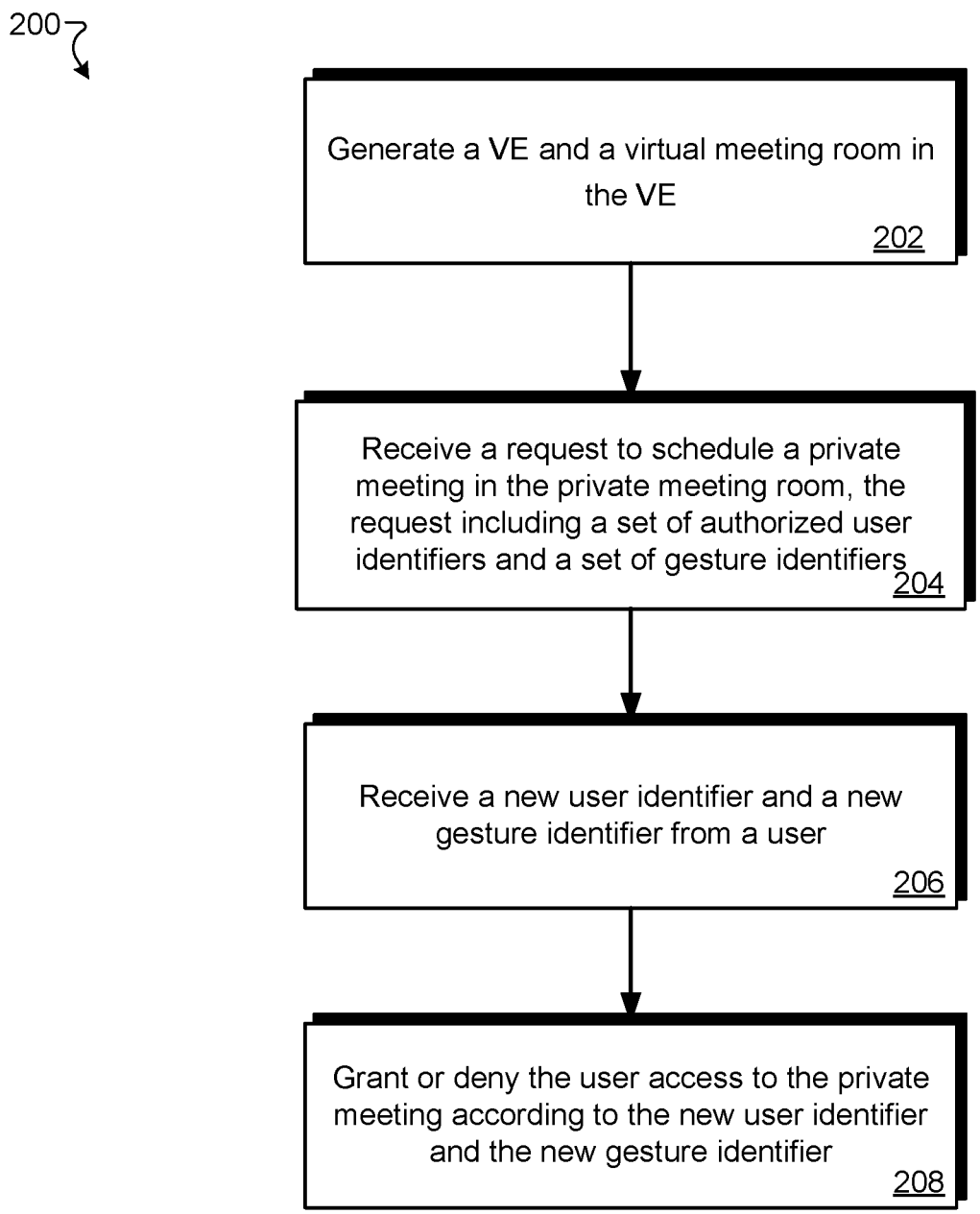
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the VR server computer 120. As illustrated in FIG. 2, the memory 126 is configured to store various data, including VE data 130, a user avatar 150, and user identifiers 154.

FIG. 2 is a flow chart depicting an example method 200 of resolving conflicts within a virtual environment. The method 200 may be performed by software constructs described in connection with FIG. 1, which reside in memory 126 of the VR server computer 120 and are run by the set of processing units 124.

At 202, the VR server computer 120 generates a virtual environment in which users external to the VR server are immersed. The virtual environment includes a virtual meeting room. Each of the set of users is immersed in the virtual environment via a respective user device.

At 204, in response to receiving the requests, the VR server computer 120 receives a request to schedule a private meeting in the virtual meeting room of the virtual environment. The request includes a set of user identifiers identifying a set of the users authorized to attend the private meeting and a set of gesture identifiers identifying a set of gestures.

At 206, the VR server computer 120 receives a new user identifier identifying a user and a new gesture indicator indicating that the user performed a gesture identified by a new gesture identifier.

At 208, the VR server computer 120 grants or denies the user access to the private meeting according to whether the new user identifier sufficiently matches one of the set of user identifiers and whether the new gesture identifier sufficiently matches one of the set of gesture identifiers.

FIGS. 3A and 3B are diagrams illustrating example gestures in a virtual environment. As shown in FIG. 3A, a user 300 has a controller 302. The user 300 looks via his head-mounted display (HMD) 310 at his avatar 320 and a private meeting room 340 in the virtual environment. To gain access to the private meeting room 340, the user makes a gesture 330.

As shown in FIG. 3B, a user 350 has a controller 352. The user 350 looks via his head-mounted display (HMD) 360 at his avatar 370. The private meeting room 340 is not visible to the user 350 in the virtual environment because the avatar 370 is remote from the private meeting room 340. To gain access to the private meeting room 340, the user 350 makes a gesture 380. In some implementations, the gesture 380 that allows user 350 into the private meeting room 340 may be different from the gesture 330.

Figure 4:
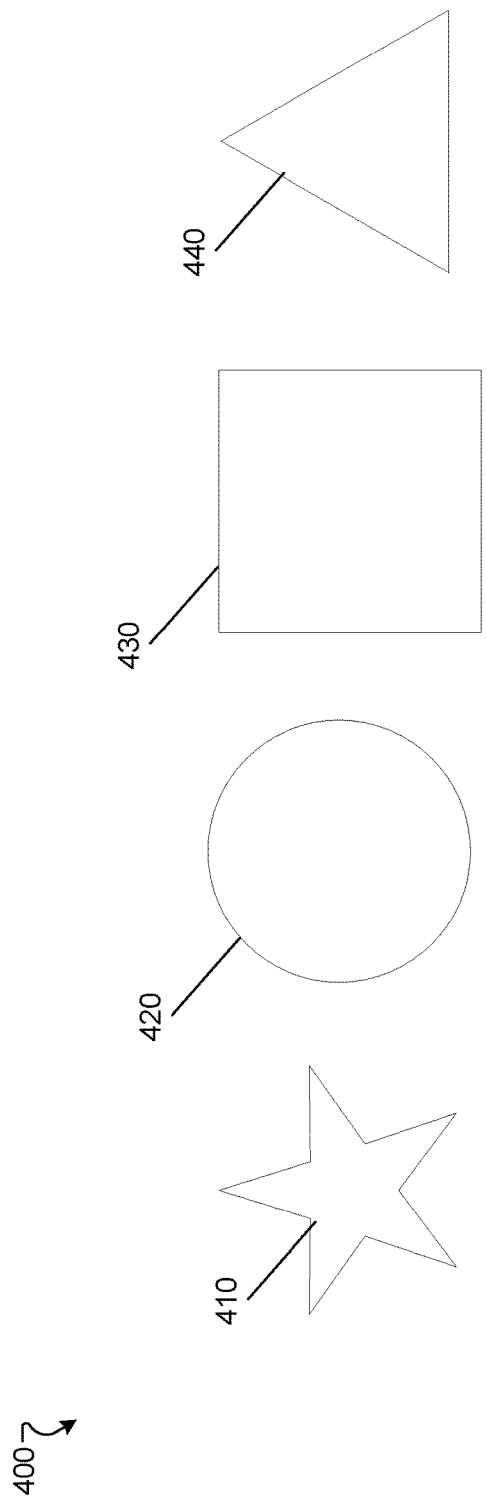
FIG. 4 is a diagram of an example set of gesture identifiers according to the improved techniques shown in FIG. 1.

FIG. 4 is a diagram illustrating various example gesture data 400 to which the gestures 330 and 380 respectively formed by the users 300 and 350 are matched against. In this example, the gesture data 400 include various geometrical shapes. Here, the gesture manager 170 (FIG. 1) matches the gesture 330 to a five-pointed star 410 because the user 300 has selected the identifier 410 as a secret handshake of the user 300 that provides access to the private meeting room 340. The gesture manager 170 attempts to match the gesture 380 to the gesture data 430, which the user 350 had previously selected. In this case, the gesture manager 170 will not be able to match the gesture 380 to the gesture data 430 because the gesture 380 more closely matches the gesture data 420.

FIGS. 5A and 5B is a diagram similar to FIG. 3 but showing the results of the gesture comparisons, FIG. 5A shows avatar 320 of user 300 being granted access to the private meeting room 340. FIG. 5B shows avatar 370 of user 350 being denied access to the private meeting room 340 (e.g., by graying out the image of the private meeting room 540). In this case, the avatar 370 may be transported to the vicinity of the private meeting room 340 to show the denial of access. The user 350 may be allowed to try to access the private meeting room 340 again.

Figure 6:
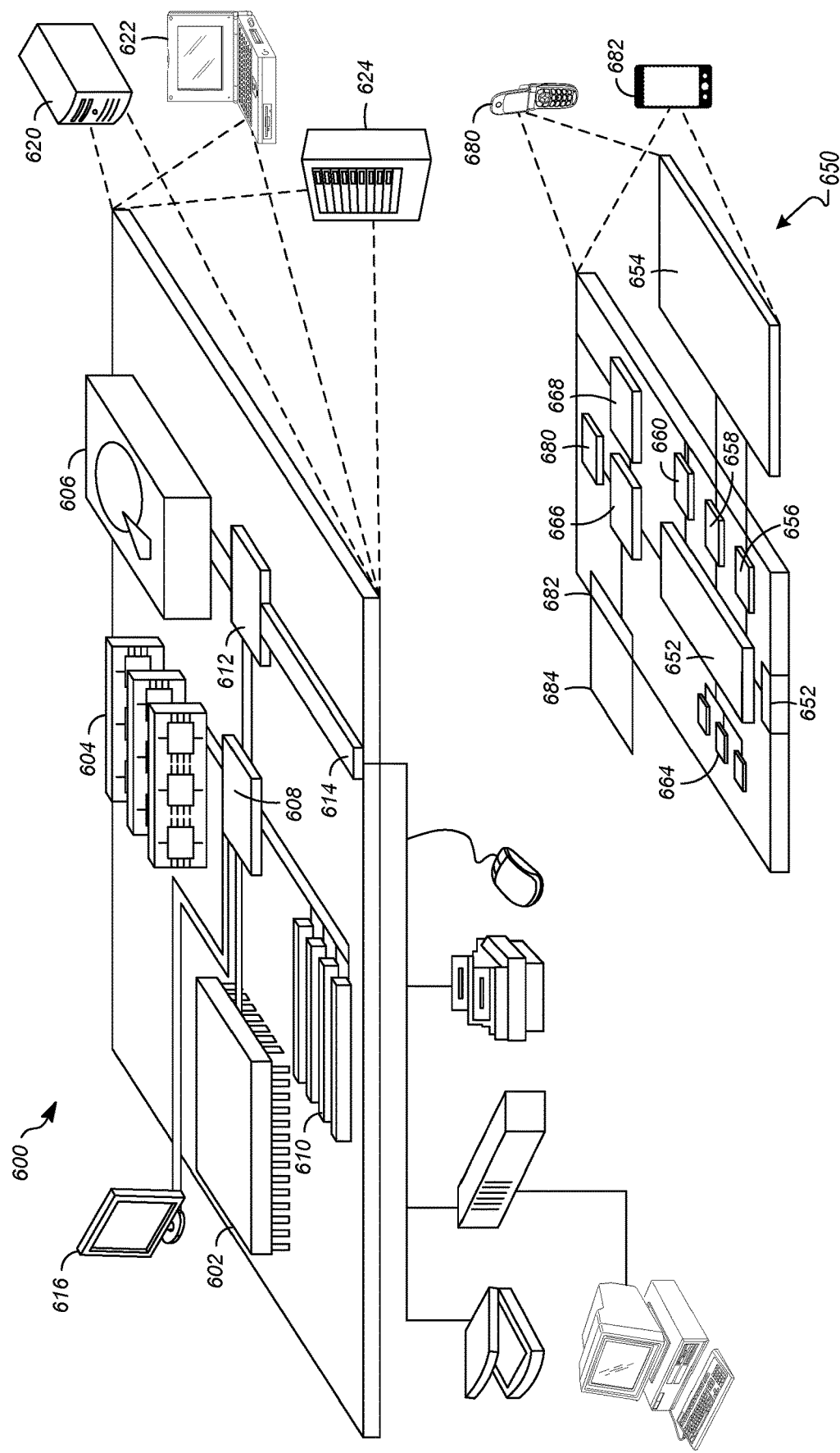
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Figure 7:
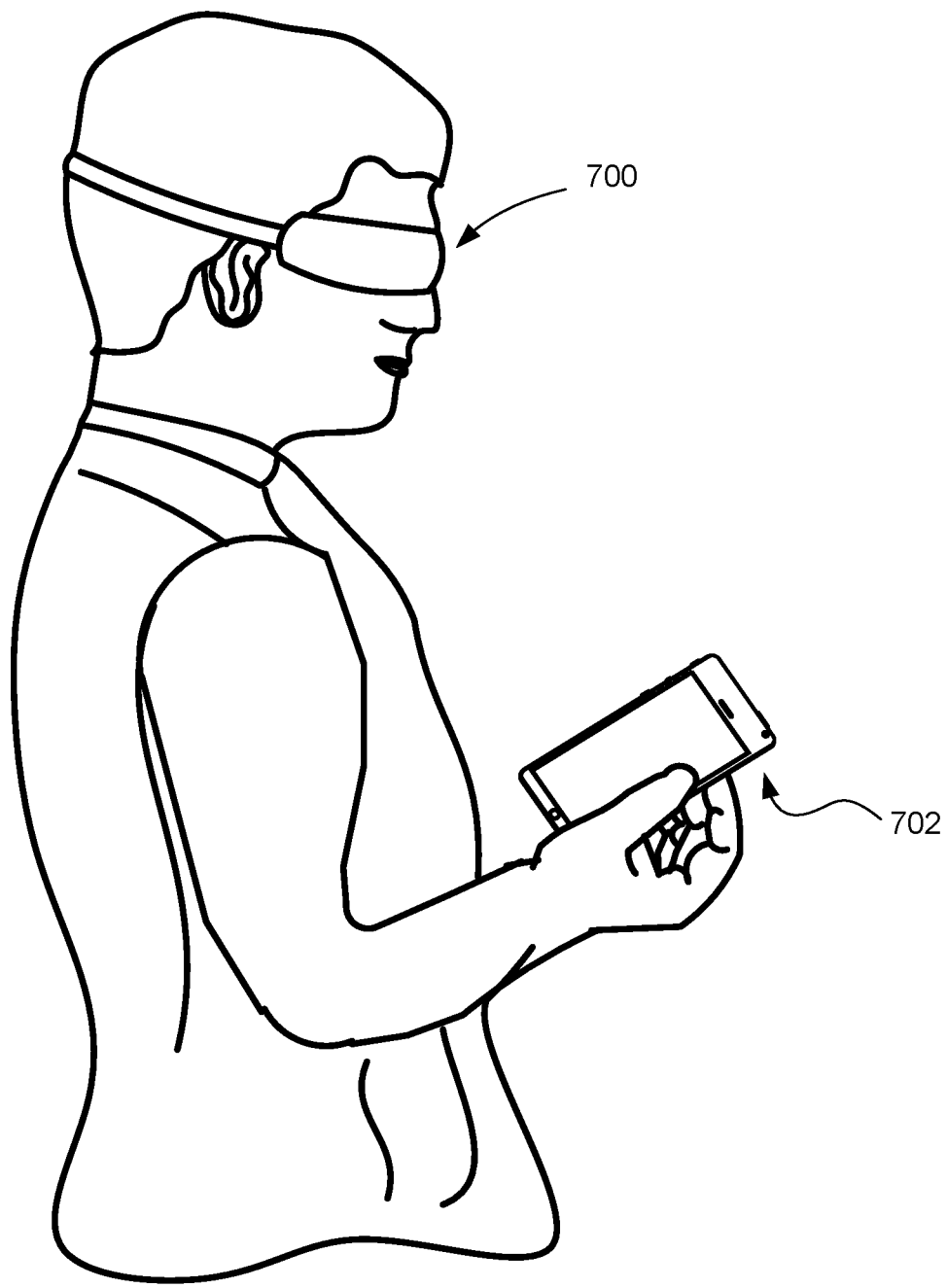
FIG. 7 is a diagram depicting an example VR head-mounted display (HMD).

FIG. 7 illustrates an example implementation of a head-mounted display as shown in FIGS. 3 and 5. In FIG. 7, a user wearing an HMD 700 is holding a portable handheld electronic device 702. The handheld electronic device 702 may be, for example, a smartphone, a controller, a joystick, or another portable handheld electronic device(s) that may be paired with, and communicate with, the HMD 700 for interaction in the immersive virtual environment generated by the HMD 700. The handheld electronic device 702 may be operably coupled with, or paired with the HMD 700 via, for example, a wired connection, or a wireless connection such as, for example, a WiFi or Bluetooth connection. This pairing, or operable coupling, of the handheld electronic device 702 and the HMD 700 may provide for communication between the handheld electronic device 702 and the HMD 700 and the exchange of data between the handheld electronic device 702 and the HMD 700. This may allow the handheld electronic device 602 to function as a controller in communication with the HMD 700 for interacting in the immersive virtual environment generated by the HMD 700. That is, a manipulation of the handheld electronic device 702, such as, for example, a beam or ray emitted by the handheld electronic device 702 and directed to a virtual object or feature for selection, and/or an input received on a touch surface of the handheld electronic device 702, and/or a movement of the handheld electronic device 702, may be translated into a corresponding selection, or movement, or other type of interaction, in the immersive virtual environment generated by the HMD 700. For example, the HMD 700, together with the handheld electronic device 702, may generate a virtual environment as described above, and the handheld electronic device 702 may be manipulated to effect a change in scale, or perspective, of the user relative to the virtual features in the virtual environment as described above.

FIGS. 8A and 8B are perspective views of an example HMD, such as, for example, the HMD 700 worn by the user in FIG. 7, and FIG. 8C illustrates an example handheld electronic device, such as, for example, the handheld electronic device 702 shown in FIG. 7.

The handheld electronic device 802 may include a housing 803 in which internal components of the device 802 are received, and a user interface 804 on an outside of the housing 803, accessible to the user. The user interface 804 may include a touch sensitive surface 806 configured to receive user touch inputs. The user interface 804 may also include other components for manipulation by the user such as, for example, actuation buttons, knobs, joysticks and the like. In some implementations, at least a portion of the user interface 804 may be configured as a touchscreen, with that portion of the user interface 804 being configured to display user interface items to the user, and also to receive touch inputs from the user on the touch sensitive surface 806. The handheld electronic device 802 may also include a light source 808 configured to selectively emit light, for example, a beam or ray, through a port in the housing 803, for example, in response to a user input received at the user interface 804.

The HMD 800 may include a housing 810 coupled to a frame 820, with an audio output device 830 including, for example, speakers mounted in headphones, also be coupled to the frame 820. In FIG. 8B, a front portion 810a of the housing 810 is rotated away from a base portion 810b of the housing 810 so that some of the components received in the housing 810 are visible. A display 840 may be mounted on an interior facing side of the front portion 810a of the housing 810. Lenses 850 may be mounted in the housing 810, between the user's eyes and the display 840 when the front portion 810a is in the closed position against the base portion 810b of the housing 810. In some implementations, the HMD 800 may include a sensing system 860 including various sensors and a control system 870 including a processor 890 and various control system devices to facilitate operation of the HMD 800.

In some implementations, the HMD 800 may include a camera 880 to capture still and moving images. The images captured by the camera 880 may be used to help track a physical position of the user and/or the handheld electronic device 802 in the real world, or physical environment relative to the virtual environment, and/or may be displayed to the user on the display 840 in a pass through mode, allowing the user to temporarily leave the virtual environment and return to the physical environment without removing the HMD 800 or otherwise changing the configuration of the HMD 800 to move the housing 810 out of the line of sight of the user.

In some implementations, the HMD 800 may include a gaze tracking device 865 to detect and track an eye gaze of the user. The gaze tracking device 865 may include, for example, an image sensor 865A, or multiple image sensors 865A, to capture images of the user's eyes, for example, a particular portion of the user's eyes, such as, for example, the pupil, to detect, and track direction and movement of, the user's gaze. In some implementations, the HMD 800 may be configured so that the detected gaze is processed as a user input to be translated into a corresponding interaction in the immersive virtual experience.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   generating, by processing circuitry of a virtual reality (VR) server, a virtual environment with which users external to the VR server interact, the virtual environment including a virtual meeting room;
   receiving, from a first user, a request to schedule a private meeting in the virtual meeting room of the virtual environment, the request including:
   a user identifier identifying a second user authorized to attend the private meeting, and
   specified gesture data resulting from a gesture specified by the first user;
   receiving a new user identifier identifying the second user and new gesture data generated by the second user; and
   granting or denying the second user access to the private meeting within the virtual environment according to whether the new user identifier matches the user identifier and whether the new gesture data matches the specified gesture data.

2. The method as in claim 1, wherein the specified gesture data describes a movement of a representation of the second user in the virtual environment, the movement forming a geometrical shape; and
   wherein granting or denying the second user access to the private meeting includes performing a matching operation to determine whether the new gesture data describes the geometric shape.

3. The method as in claim 1, wherein granting or denying the second user access to the private meeting includes performing a transporting operation on an avatar representing the second user in response to the new user identifier matching the user identifier and the new gesture data matching the specified gesture data, the transporting operation bringing the avatar from a location within the virtual environment from which the second user generated the new gesture data to the virtual meeting room.

4. The method as in claim 1, further comprising, in response to receiving the request to schedule the private meeting in the virtual meeting room of the virtual environment,
   generating a token for the private meeting, the token identifying the private meeting room; and
   sending the token to the second user, and
   wherein receiving the new user identifier identifying the second user includes obtaining the token from the second user.

5. The method as in claim 4, wherein generating the token for the private meeting includes producing a cryptographic key and distributing the cryptographic key to the second user.

6. The method as in claim 1, wherein receiving the request to schedule the private meeting in the virtual meeting room of the virtual environment includes obtaining an event identifier indicating an event at which occurrence the meeting is scheduled to begin, and
   wherein the request is received in response to the occurrence of the event.

7. The method as in claim 1, further comprising:
   storing the gesture data in a memory of the VR server in response to receiving the request to schedule the private meeting in the virtual meeting room of the virtual environment, and
   deleting the gesture data from the memory of the VR server after the private meeting adjourns.

8. The method as in claim 1, further comprising performing a comparison operation on the new gesture data, the specified gesture data, and other gesture data, and
   wherein granting or denying the second user the access to the private meeting within the virtual environment according to whether the new user identifier matches the user identifier and whether the new gesture data matches the specified gesture data includes:
     granting the second user access to the private meeting in response to the new gesture data more closely matching the specified gesture data than the other gesture data; and
     denying the second user access to the private meeting in response to the new gesture data more closely matching the other gesture data than the other gesture data.

9. A computer program product comprising a nontransitive storage medium, the computer program product including code that, when executed by processing circuitry of a virtual reality (VR) server, causes the processing circuitry to perform a method, the method comprising:
   generating a virtual environment with which users external to the VR server interact, the virtual environment including a virtual meeting room;
   receiving, from a first user, a request to schedule a private meeting in the virtual meeting room of the virtual environment, the request including:
     a user identifier identifying a second user authorized to attend the private meeting, and
     specified gesture data resulting from a gesture specified by the first user;
   receiving a new user identifier identifying the second user and new gesture data generated by the second user; and
   granting or denying the second user access to the private meeting within the virtual environment according to whether the new user identifier matches the user identifier and whether the new gesture data matches the specified gesture da.

10. The computer program product as in claim 9, wherein the specified gesture data describes a movement of a representation of the second user in the virtual environment, the movement forming a geometrical shape; and
    wherein granting or denying the second user access to the private meeting includes performing a matching operation to determine whether the new gesture data describes the geometric shape.

11. The computer program product as in claim 9, wherein granting or denying the second user access to the private meeting includes performing a transporting operation on an avatar representing the second user in response to the new user identifier matching the user identifier and the new gesture data matching the specified gesture data, the transporting operation bringing the avatar from a location within the virtual environment from which the second user generated the new gesture data to the virtual meeting room.

12. The computer program product as in claim 9, wherein the method further comprises, in response to receiving the request to schedule the private meeting in the virtual meeting room of the virtual environment,
    generating a token for the private meeting, the token identifying the private meeting room; and
    sending the token to the second user, and
    wherein receiving the new user identifier identifying the second user includes obtaining the token from the second user.

13. The computer program product as in claim 12, wherein generating the token for the private meeting includes producing a cryptographic key and distributing the cryptographic key to the second user.

14. The computer program product as in claim 9, wherein receiving the request to schedule the private meeting in the virtual meeting room of the virtual environment includes obtaining an event identifier indicating an event at which occurrence the meeting is scheduled to begin, and
    wherein the request is received in response to the occurrence of the event.

15. The computer program product as in claim 9, wherein the method further comprises:
    storing the gesture data in a memory of the VR server in response to receiving the request to schedule the private meeting in the virtual meeting room of the virtual environment, and
    deleting the gesture data from the memory of the VR server after the private meeting adjourns.

16. An electronic apparatus, comprising:
    a network interface;
    memory; and
    controlling circuitry coupled to the memory, the controlling circuitry being configured to:
      generate a virtual environment with which users external to the VR server interact, the virtual environment including a virtual meeting room;

receive, from a first user, a request to schedule a private meeting in the virtual meeting room of the virtual environment, the request including:
    a user identifier identifying a second user authorized to attend the private meeting, and
    specified gesture data resulting from a gesture specified by the first user;
receive a new user identifier identifying the second user and new gesture data generated by the second user; and
grant or deny the second user access to the private meeting within the virtual environment according to whether the new user identifier matches the user identifier and whether the new gesture data matches the specified gesture data.

17. The electronic apparatus as in claim 16, wherein the specified gesture data describes a movement of a representation of the second user in the virtual environment, the movement forming a geometrical shape; and
    wherein the controlling circuitry configured to grant or deny the second user access to the private meeting is further configured to perform a matching operation to determine whether the new gesture data describes the geometric shape.

18. The electronic apparatus as in claim 16, wherein the controlling circuitry configured to grant or deny the second user access to the private meeting is further configured to perform a transporting operation on an avatar representing the second user in response to the new user identifier matching the user identifier and the new gesture data matching the specified gesture data, the transporting operation bringing the avatar from a location within the virtual environment from which the second user generated the new gesture data to the virtual meeting room.

19. The electronic apparatus as in claim 16, wherein the controlling circuitry is further configured to, in response to receiving the request to schedule the private meeting in the virtual meeting room of the virtual environment,
    generate a token for the private meeting, the token identifying the private meeting room; and
    send the token to the second user, and
    wherein the controlling circuitry configured to receive the new user identifier identifying the second user is further configured to obtain the token from the second user.

20. The electronic apparatus as in claim 16, wherein the controlling circuitry configured to receive the request to schedule the private meeting in the virtual meeting room of the virtual environment is further configured to obtain an event identifier indicating an event at which occurrence the meeting is scheduled to begin, and
    wherein the request is received in response to the occurrence of the event.

21. The electronic apparatus as in claim 16, wherein the controlling circuitry is further configured to:
    store the set of gesture identifiers in a memory of the VR server in response to receiving the request to schedule the private meeting in the virtual meeting room of the virtual environment, and
    delete the set of gesture identifiers from the memory of the VR server after the private meeting adjourns.

* * * * *